United States Patent [19]

Chrysler

[11] 4,133,576
[45] Jan. 9, 1979

[54] HATCH FOR VEHICLE ROOFS

[76] Inventor: Richard R. Chrysler, 8940 Rickett Rd., Brighton, Mich. 48116

[21] Appl. No.: 821,041

[22] Filed: Aug. 17, 1977

[51] Int. Cl.² ............................................. B60J 7/10
[52] U.S. Cl. ............................... 296/137 B; 49/464; 49/465
[58] Field of Search .............. 296/137 B; 49/465, 464

[56] References Cited

U.S. PATENT DOCUMENTS

| | | | |
|---|---|---|---|
| 2,173,890 | 9/1939 | Tuttle | 296/137 B |
| 3,782,776 | 1/1974 | Ormont | 296/137 B |
| 3,949,624 | 4/1976 | Bienert | 296/137 B |
| 3,955,848 | 5/1976 | Lutz | 296/137 B |
| 3,972,558 | 8/1976 | Horn | 296/137 B |
| 3,974,753 | 8/1976 | Blomgren | 296/137 B |
| 3,975,049 | 8/1976 | Niessner | 296/137 B |

*Primary Examiner*—Robert R. Song
*Attorney, Agent, or Firm*—Fisher, Gerhardt & Groh

[57] ABSTRACT

A hatch assembly for vehicle roofs in which an opening is covered by a pair of panels disposed in side by side relationship to each other and being held in position by a latch system which permits the panels to be used in a partially open position or to be completely removed and stowed separately of the vehicle. The framed opening and panels incorporate a sealing system which diverts moisture away from the hatch assembly and allows drainage of water that does enter the hatch assembly.

14 Claims, 10 Drawing Figures

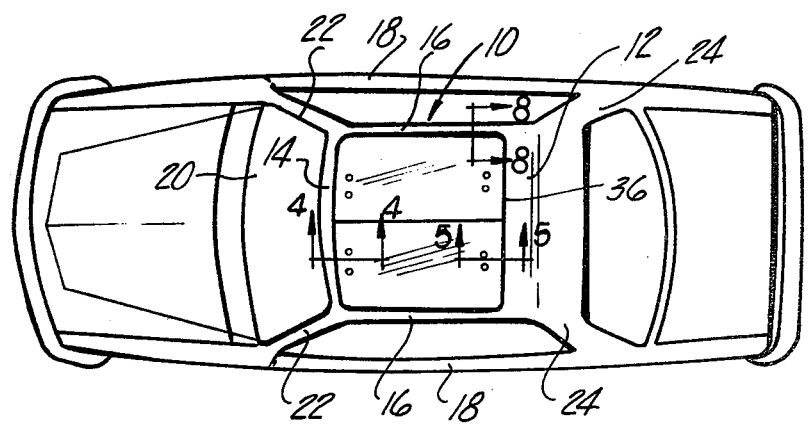
Fig-1
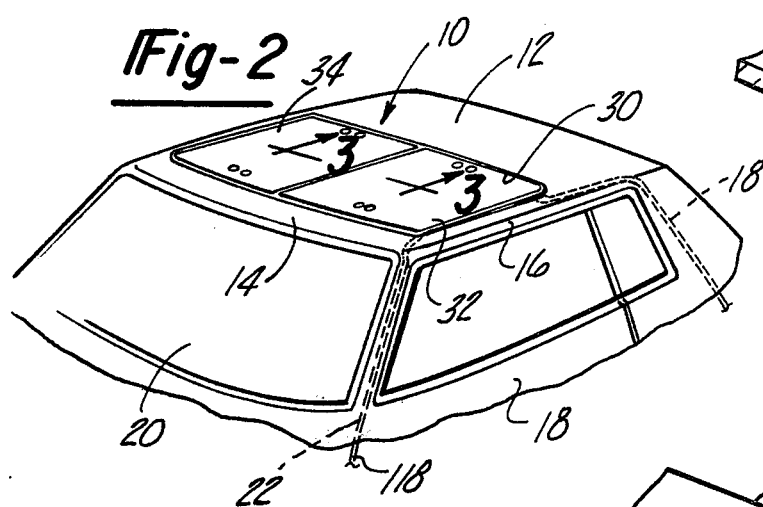
Fig-2
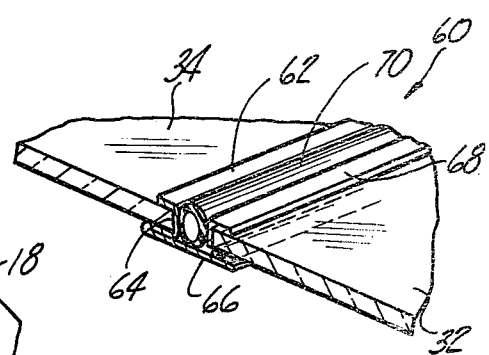
Fig-3
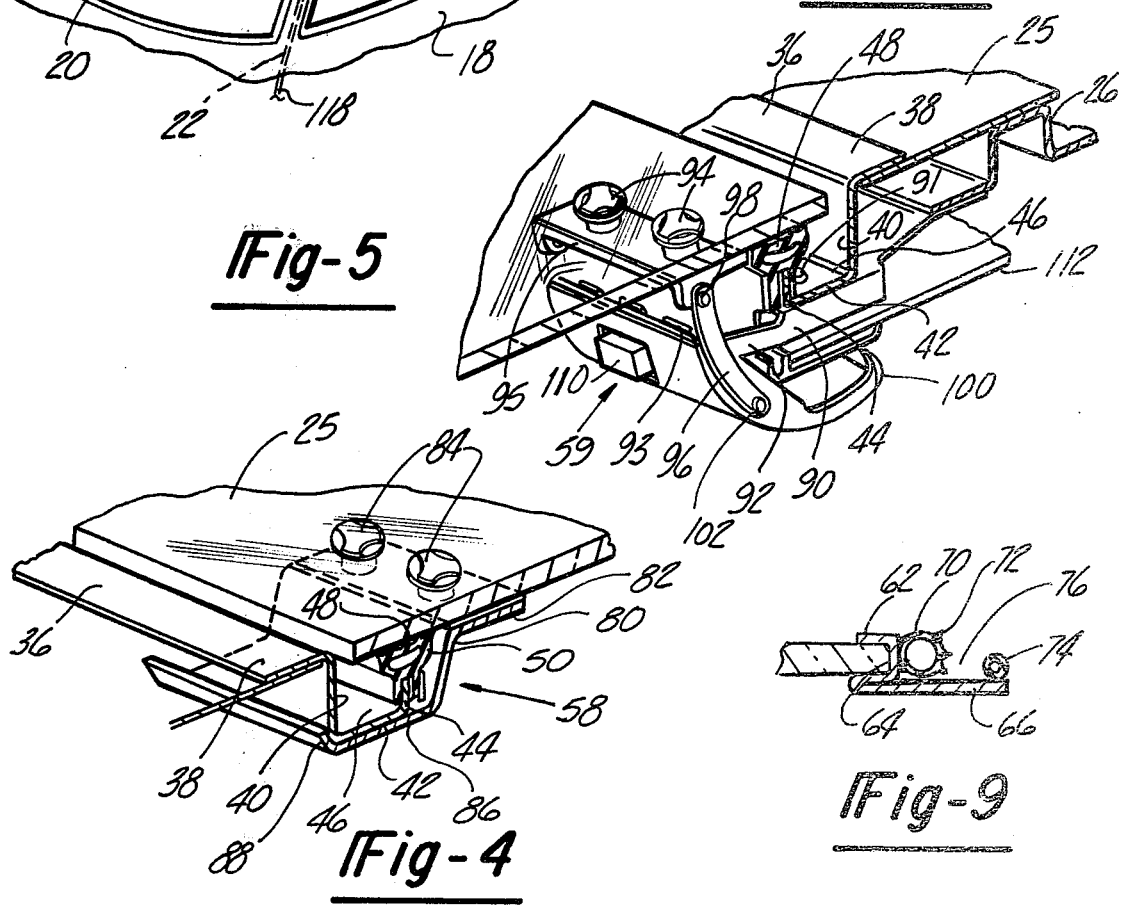
Fig-5
Fig-4
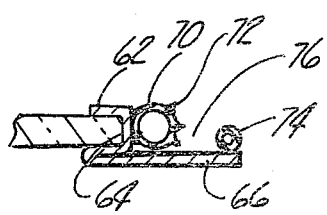
Fig-9

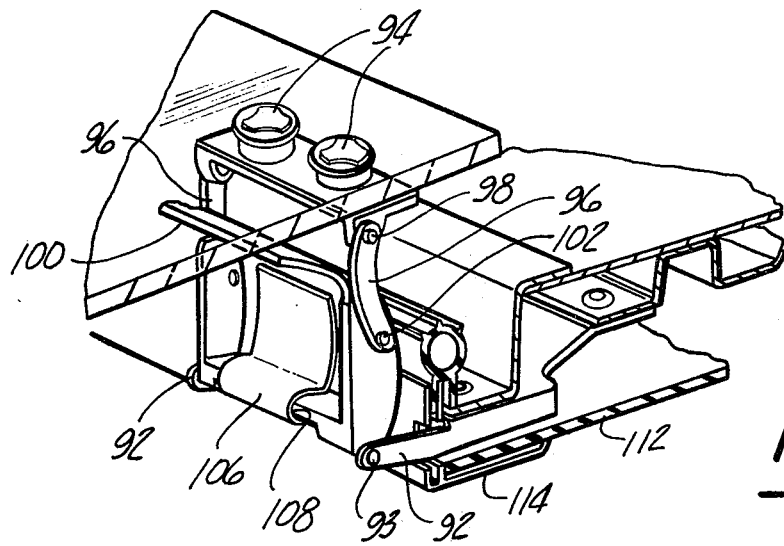
Fig-6
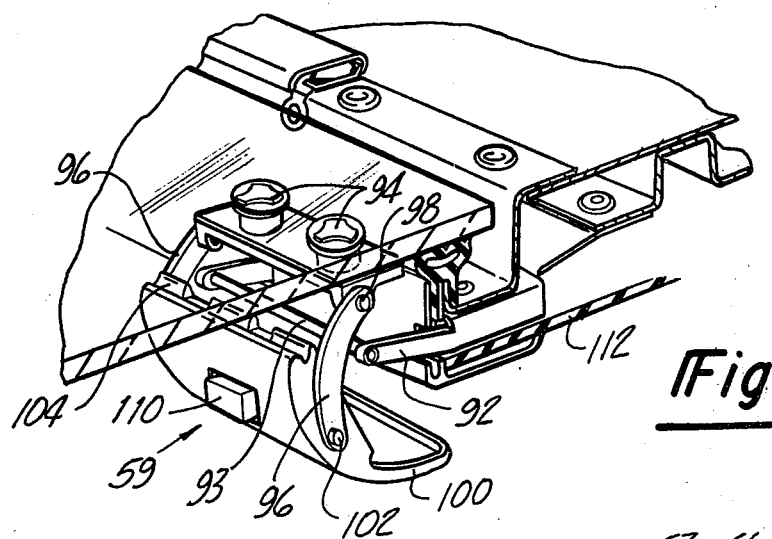
Fig-7
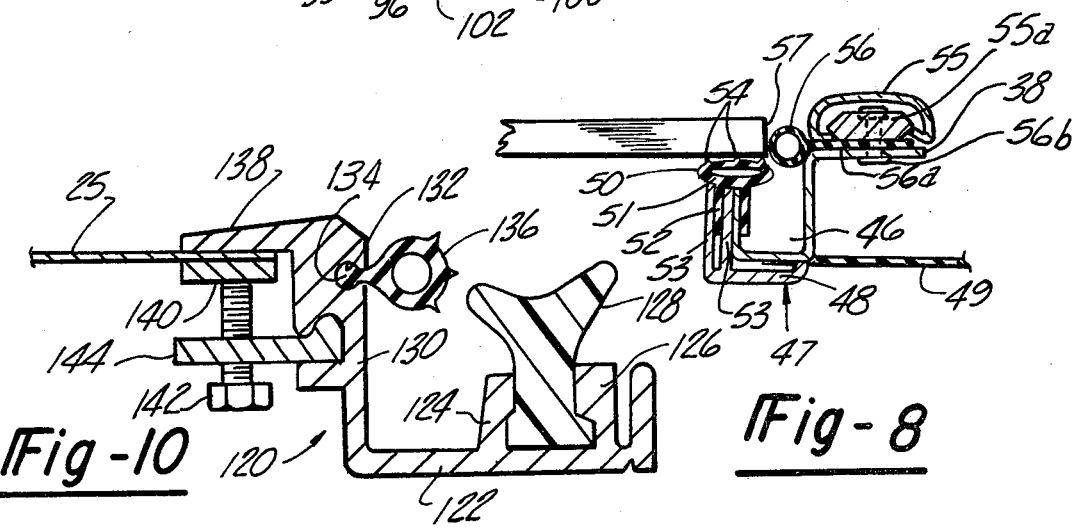
Fig-10
Fig-8

HATCH FOR VEHICLE ROOFS

This invention relates to removable hatches for openings in vehicle roofs and particularly such hatch arrangements in which the hatches are completely removable from the opening.

Removable hatch arrangements for vehicle roofs have ordinarily been of a single panel type, that is, an arrangement in which a single panel covers a single opening. Such arrangements put a limitation on the size of the hatch opening which may be formed in the vehicle roof for the reason that a large opening with a single panel makes the panel of such weight, particularly if it is made of glass, that it becomes difficult to manipulate upon removable and reinstallation. As a consequence the maximum size of a roof opening that can be covered by a single panel becomes limited in size from a practical standpoint.

It is highly desirable and is an object of the invention to provide a vehicle hatch roof arrangement in which the opening may be substantially the full width of the roof of the vehicle and of a substantial size.

Another object of the invention is to provide a vehicle roof hatch assembly in which a pair of panels are provided to cover a single opening in the vehicle roof.

A further object of the invention is to provide a hatch assembly for a vehicle roof in which a pair of panels close an opening and in which a selected one of the panels may be removed leaving the other panel in position.

Still another object of the invention is to provide a roof hatch assembly for vehicles in which a pair of adjoining panels cover an opening in the vehicle roof and the pair of panels may be pivoted as a unit along a forward edge to a partially open position and still maintain the pair of panels connected to each other and to the vehicle.

A hatch assembly for vehicle roofs is provided wherein an opening in a vehicle roof is covered by a pair of panels disposed in side by side relationship to each other and held in position by a latch means acting to hold the panels in closed sealing relationship to a frame around the opening and permit removal of the panels independently of each other or permit the panels to be moved to a partially predetermined open position while at the same time remaining connected to the vehicle. In the closed position the panels engage a sealing system which accumulates moisture and diverts it in a channel system to discharge tubes and to the roadway so that the moisture is not maintained in the position where it can seep into the interior of the vehicle.

Other objects of the invention will be apparent from the following description of the preferred embodiment and from the drawings in which:

FIG. 1 is a plan view of a vehicle embodying the hatch of the present invention;

FIG. 2 is a perspective view at an enlarged scale of a vehicle roof assembly showing a hatch structure embodying the invention;

FIG. 3 is a perspective view at an enlarged scale taken generally on line 3—3 in FIG. 2;

FIG. 4 is a perspective view in section taken on line 4—4 in FIG. 1 and showing a forward portion of the hatch assembly;

FIG. 5 is a perspective view taken generally on line 5—5 in FIG. 1 and showing the rearward latch mechanism for locking the hatch assembly in closed position;

FIG. 6 is a view similar to FIG. 5 showing the latch assembly in another position of operation to hold the hatch assembly in a partially open position;

FIG. 7 is another view similar to FIG. 5 showing the latch assembly in its unlocked position to permit removal of the panels of the hatch assembly;

FIG. 8 is a sectional view taken on line 8—8 in FIG. 1;

FIG. 9 is a cross-sectional view of one of the hatch panels and seal arrangement seen also in FIG. 3; and FIG. 10 is a cross-sectional view taken generally on line 8—8 in FIG. 1 and showing a modified form of the frame to support the hatch panels.

Referring to the drawings, a hatch assembly embodying the invention is designated generally at 10 and is shown installed in the roof 12 of an automotive vehicle which includes a windshield header 14 and longitudially extending side rails 16 above the doors 18. The forward end of the roof structure is supported at opposite sides of the windshield 20 by generally vertically sloped pillars 22 at opposite sides of the windshield and generally vertically extending pillar structures 24 rearwardly of the door 18. The entire structure is covered by a skin or sheet of material 25, usually of metal which is integrally fastened to the header side rails 16 and to one or more transversely extending structural cross members 26.

The removable hatch assembly 10 of the present invention has a single opening 30 in the vehicle roof and as illustrated in FIG. 1, extends substantially the full width of the roof. The opening 30 is covered by a pair of panels 32 and 34 which extend longitudially of the vehicle roof 12 in side by side relationship to each other.

The opening 30 has its entire perimeter bordered with a frame 36. The frame 36 may be in a form of a continuous sheet metal stamping having a flange 38 adapted to engage the top surface 25 of the roof and to fasten to the latter by welding or the like. A wall 40 depends from the flange 38 and merges with a bottom wall 42, an edge of which is provided with a lip 44 parallel to the wall 40. The wall 40, bottom 42 and lip 44 form a trough 46 in the frame 36 which operates to collect and divert moisture from the roof of the vehicle.

As best seen in FIG. 8, a decorative molding 47 of plastic or the like is fastened to the lip 44. The molding 47 has a flange 48 extending under the frame 36 to support the usual head liner 49 of the vehicle interior to the frame. The lip 44 of the frame supports a seal 50 which has a tubular main body 51 and integrally formed parallel legs 52 forming a groove to receive the lip 44 of the frame 36 and one of a pair of legs 53 of the molding 47. The seal 50 may be held in position by means of adhesive of the like. The main tubular body 51 of the seal 50 is provided with a plurality of wiper blade portions 54 which assist sealing engagement with the underside surface of the panels contacted by the seal 50 and also assist in wiping moisture from the surfaces which may have accumulated adjacent the sealing surfaces. The seal 50 extends continuously around the entire perimeter of the opening 30 to engage the panels 32 and 34 and prevents moisture from entering the interior of the vehicle.

The flange 38 of the frame 36 may be covered with an ornamental molding 55 attached to the frame 36 through a bar 55a. A seal 56 having a generally tubular body portion has an integral flange 56a held in position by the bar 55a and rivits 56b. The tubular body portion is adapted to engage the edge 57 of the panels 32 and 34 to obstruct the passage of moisture from the exterior roof surfaces of the vehicle into the trough 46 of the frame 36.

The panels 32 and 34 which cover and close the opening 30 rest on the seal 50 and are held in position relative thereto by a latching system which includes a pair of detachable forward hinge members 58 at a forward edge of the panel member 32 and 34 and a pair of latch assemblies 60 associated with the rearward edges of the panel members.

Referring now to FIGS. 3 and 9, the pair of panels 32 and 34 are held in adjacent detachable relationship relative to each other by a sealing assembly 60 which includes a metalic molding member 62 forming a channel 64 which receives one edge of the panel 34 and provides a flange portion 66 which projects beyond the edge of the panel 34. The adjoining panel 32 is provided with a molding strip 68 which may be held in position by adhesive or the like.

A seal element 70 having a generally tubular cross section is secured to the edge of the molding 62 by adhesive or the like and is provided with wiper blade elements 72 which are engagable with a face of the molding strip 68. The seal 70 may be considered as fastened to the edge of one panel 34 and engagable with the edge of the other panel 32. The flange portion 66 has a sealing member 74 similar to the seal 70 but of smaller cross section which is secured by adhesive to the upper surface of the flange 66. The sealing member 74 forms the wall of a trough 76 which serves to accumulate moisture in the central seal assembly 60 and divert it longitudinally so that it spills from the opposite ends into the trough 46 formed by the frame member 36.

The panels 32 and 34 are easily separable from each other and in the closed position of the hatch assembly, the seals 70 and 74 preclude the passage of moisture. In the detached condition of the latch assemblies 59 and forward hinge 58, the panels 32 and 34 are easily separated from each other since the panel 32 simply rests on the seal 74 and its edge engages the seal 70.

Referring now to FIG. 4, the detachable forward hinge members 58 each include a bracket member 80 having a flange 82 which engages the underside of the respective panel 32 or 34 and is fastened thereto in any conventional manner by adhesive or by a pair of fasteners 84 passing through openings in the panels. The hinge member 58 has a base portion 86 which engages the underside of the frame 36 at the underside of the trough 46 and the forward edge is provided with a lip 88. When the panels 32 and 34 are in position closing the opening 30, the base portion 86 serves to press the panel downwardly against the seal 50 to distort the tubular body portion 51 and the lip portion 88 engages the wall 40 to prevent fore and aft movement of the panels relative to the frame member 36.

Referring now to FIG. 5, the rear latch assemblies 59 by which the rear portion of the panels 32 and 34 are secured in position relative to the frame 36 include a bracket member 90 fastened to the frame 36 by bolts 91 or the like. The bracket member includes a pair of legs 92 the end of which support the over center pin 93, best seen in FIG. 6 or 7, which is disposed generally transversely of the vehicle. The complementary portion of the latch assembly 59 is mounted on the panels 32 and 34 and is secured in position by fasteners 94 seated in openings in the panels. The panel associated portion of the latch assembly 59 includes a base member 95 to which a pair of straps 96 are pivoted at 98. The opposite ends of the straps 96 are pivoted to the handle portion 100 by pins 102. The handle 100 is provided with a groove 104 which is complementary to and enagable with the over center pin 93. In the locked position of the latch assembly 59, as best seen in FIG. 5, the groove 104 is in engagement with the over center pin 93 so that the pivot pins 98 and 102 lie in a plane to one side of the over center pin 93 and maintain the latch assembly in its locked condition.

Referring now to FIG. 6, the panels 32 and 34 may be held in a partially opened position relative to the roof 12 of the vehicle by moving the handle 100 from its latched or locked position seen in FIG. 5 to the position seen in FIG. 6 in which the pivot pins 98 and 102 are disposed to one side of the over center pin 93 and the links or straps 96 act as an extension of the handle 100. The handle 100 and straps 96 form an extended structure to hold the rearward portion of the panel assembly in an elevated position above the roof level permitting a slight opening between the roof opening 30 and the panels. In the partially open position the hinge members 58 maintain engagement with the forward portion or wall 40 of the frame 36 and prevent displacement of the panels and separation from the roof 12.

In both the locked position seen in FIG. 5 and the partially open position seen in FIG. 6, the groove 104 of the handle 100 is held in engagement with the over center pin 93 by a resilient, spring like strap 106. The strap 106 is fastened to the handle member 100 and the free end forms a groove 108 engagable with the over center pin 93. A push button 110 is disposed in the handle 100 and is engagable with the spring strap 106 so that pressure on the button 110 deflects the spring and permits its disengagement from the over center pin 93.

As shown in FIG. 7, the spring strap 106 and latch assemblies 59 are disengaged. When both of the latch assembly 59 asscoiated with the panels 32 and 34 are in the condition seen in FIG. 7, the rear edges of the panels 32 and 34 may be moved upwardly about the pivot formed by the detachable hinge member 58. After the lip 88 clears the frame member 36, the panels 32 and 34 may be removed from the opening 30 and may be handled separately of each other by separating one panel from the other at the central seal assembly 60. The separate panels 32 and 34 may then be stored, for example, in the luggage compartment of the vehicle.

The assembly described can be installed in the roof of a conventional vehicle by cutting away the appropriate roof portion and interior liner 112 of the vehicle after which the frame 36 may be installed. The frame 36 as seen in FIG. 6 is adapted to receive a molding 114 fastened to the frame and holding the head liner 112 in position relative to the frame.

When the panels 32 and 34 are in position to close the opening 30, the trough 76 formed by the seal assembly 60 between the panels 32 and 34 accumulates moisture seeping past the seal 60 and delivers it from opposite ends of the trough 76 to the trough 46 formed by the frame 36. Moisture accumulating in the trough 46 is diverted from the frame portion 36 at the four corners by flexible tubes 118 seen in FIG. 2 extend from the trough 46 down the forward pillars 22 and rearwardly pillars 24. The lower ends of the tube 22 and 24 spill onto the roadway.

If desired the frame 36 may be formed of an aluminum extrusion 120 such as seen in FIG. 10 instead of being stamped from steel or the like. The aluminum extrusion 120 may be bent at the four corners to conform to the opening 30 and the abutting ends may be fastened in any conventional manner. The extrusion 120 has a base portion 122 which has a pair of walls 124 and 126 forming a trough to receive a seal 128 which is adapted to engage the underside of the panels 32 and 34. Extending upwardly from the base 122 is a generally vertical wall 130 which is formed with a groove 132 to receive a bead 134 on an optional seal 136. The optional seal 136 is adapted to engage the edge of panels 32 and 34. Extending from an upper end of the vertical wall 130 is a flange 138 which is adapted to rest on the sheet metal of the roof panel 25. A reinforcement strip 140 is place at the opposite side of the roof panel 25 and is held in position relative to the flange 138 by set bolts 142 and locking tabs 144. The seal 128 and wall 130 define opposite sides of a trough which receives and diverts moisture.

A hatch assembly for vehicles has been provided in which an opening in the roof of the vehicle is covered by a pair of panels which are disposed in side by side relationship to each other in such a manner that the panels may be held in closed sealing engagement with the roof of the vehicle to prevent moisture form leaking into the vehicle and such moisture which does accumulate is diverted by a trough arrangement formed by the panels and around the perimeter of the opening. The latch means by which the pair of panels are locked in closed position also permits the panel to be tilted to a partially open position or in the alternative to be released so that the panels may be completely removed.

I claim:

1. A hatch assembly for vehicle roofs comprising; an opening in said vehicle roof, said opening having a frame structure around its perimeter, a pair of panels covering said opening, said panels being disposed in substantially the same plane and in side by side relationship to each other, latch means associated with said pair of panels and having a locked position to hold said panels closed relative to said opening and on said frame and an open position permitting removal of said panels from said opening, said latch means permitting hinging movement of said pair of panels from said closed to a predetermined partially open position while said panels remain attached to said frame.

2. The combination of claim 1 in which said latch means include a hinge member and latch assembly associated with each of said panels.

3. A hatch assembly for vehicle roofs comprising; an opening in said vehicle roof, said opening having a frame structure around its perimeter, a pair of panels covering said opening, said panels being disposed in substantially the same plane and in side by side relationship to each other, latch means associated with said panels closed relative to said opening and on said frame and an unlocked position permitting removal of said panels from said opening, said latch assemblies being movable between a closed position holding said panels relative to said frame structure and an open position permitting removal of said panels from said panels from said roof structure, a selected one of said panels being removable from said opening when the associated latch assemblies are in their open position.

4. A hatch assembly for vehicle roofs comprising; an opening in said vehicle roof, said opening having a frame structure around its perimeter, a pair of panels covering said opening, said panels being disposed in substantially the same plane and in side by side relationship to each other, latch means associated with said pair of panels and giving a locked position to hold said panels closed relative to said opening and on said frame and an unlocked position permitting removal of said panels from said opening; said latch means including a hinge member and latch assembly associated with each of said panels, said latch assemblies being associated with corresponding ends of said panels and permit pivotal movement of said panels from a closed position to a predetermined partially open position as a unit, said latch assemblies maintaining said panels in said partially open position as a unit, said latch assemblies maintaining said panels in said partially open position.

5. The combination of claim 4 in which said hinge members are associated with corresponding forward ends of said panel, said hinge members being in engagement with said frame structure to prevent removal of said panels when the latter are in their closed and predetermined partially open position and are detachable from said frame upon movement of said panels beyond said predetermined partially open position.

6. The combination of claim 2 and further comprising first seal means disposed in sealing engagement between said panels when said panels are disposed in closed position relative to the opening.

7. The combination of claim 6 and further comprising second seal means engaging an underside of said panels and secured to the perimeter of said frame.

8. The combination of claim 6 and further comprising second seal means on said frame and in sealing engagement with the underside of said panels, said first and second seal means forming drain channels communicating with each other to form a drain system.

9. The combination of claim 6 wherein a center strip member is attached to one panel and forms a receiving portion detachably receiving the adjoining edge of the other panel.

10. The combination of claim 9 in which said receiving portion has a seal connected thereto with an opposed portion sealingly engaged with the edge of the adjacent panel.

11. The combination of claim 4 wherein said receiving portion has a seal element extending for the full length of said center strip member and is engagable with the underside of said adjacent panel.

12. The combination of claim 11 in which said center strip member and additional seal means form a drain channel for directing flow of water from said panels.

13. The combination of claim 12 in which said frame portion forms a main drain channel for water and in which said drain channel of said center strip member communicates with said main drain channel.

14. A hatch assembly for vehicle roofs comprising; an opening in said vehicle roof, said opening having a frame structure around its perimeter, a pair of panels supported on said frame in contiguous side by side relationship to each other to cover said opening, latch means associated with said pair of panels at forward and rearward edges thereof, said latch means having a locked position to hold said panels closed relative to said opening and on said frame and an unlocked position permitting removal of a selected one of said panels from said frame, the remaining one of said panels being positionable in a closed position relative to said opening.

* * * * *